Feb. 12, 1963 — E. W. PARLASCA — 3,077,170
TUBE FORMING METHOD
Filed Jan. 13, 1955 — 4 Sheets-Sheet 2
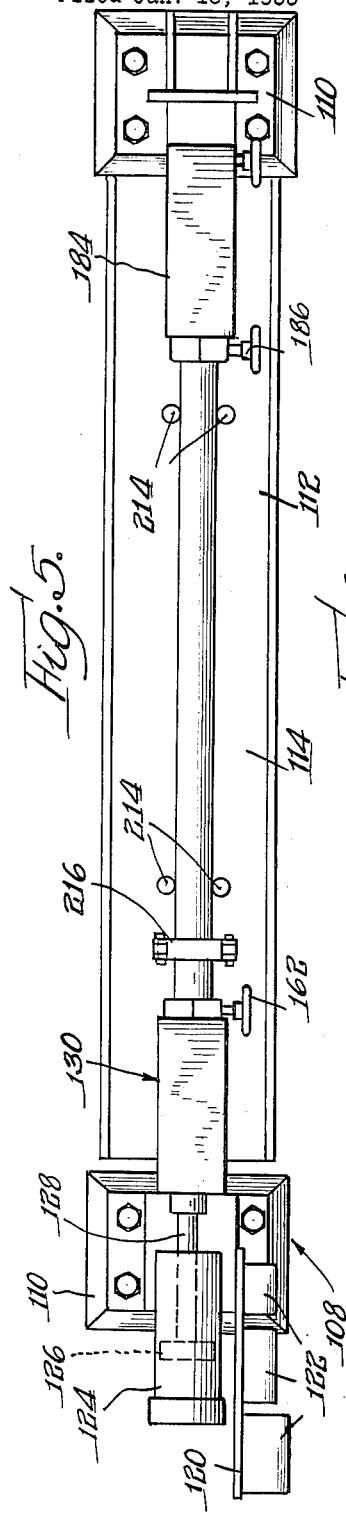
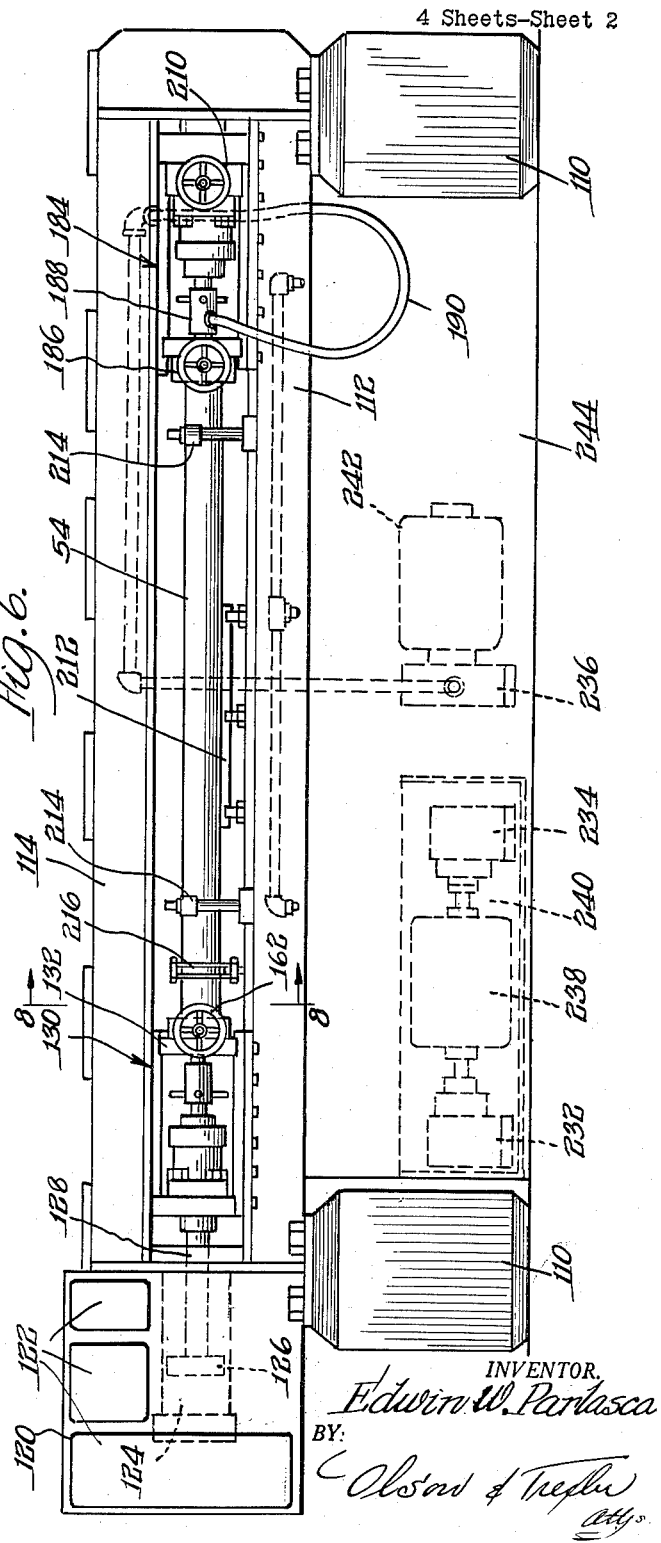
INVENTOR.
Edwin W. Parlasca
BY: Olson & Trexler
attys

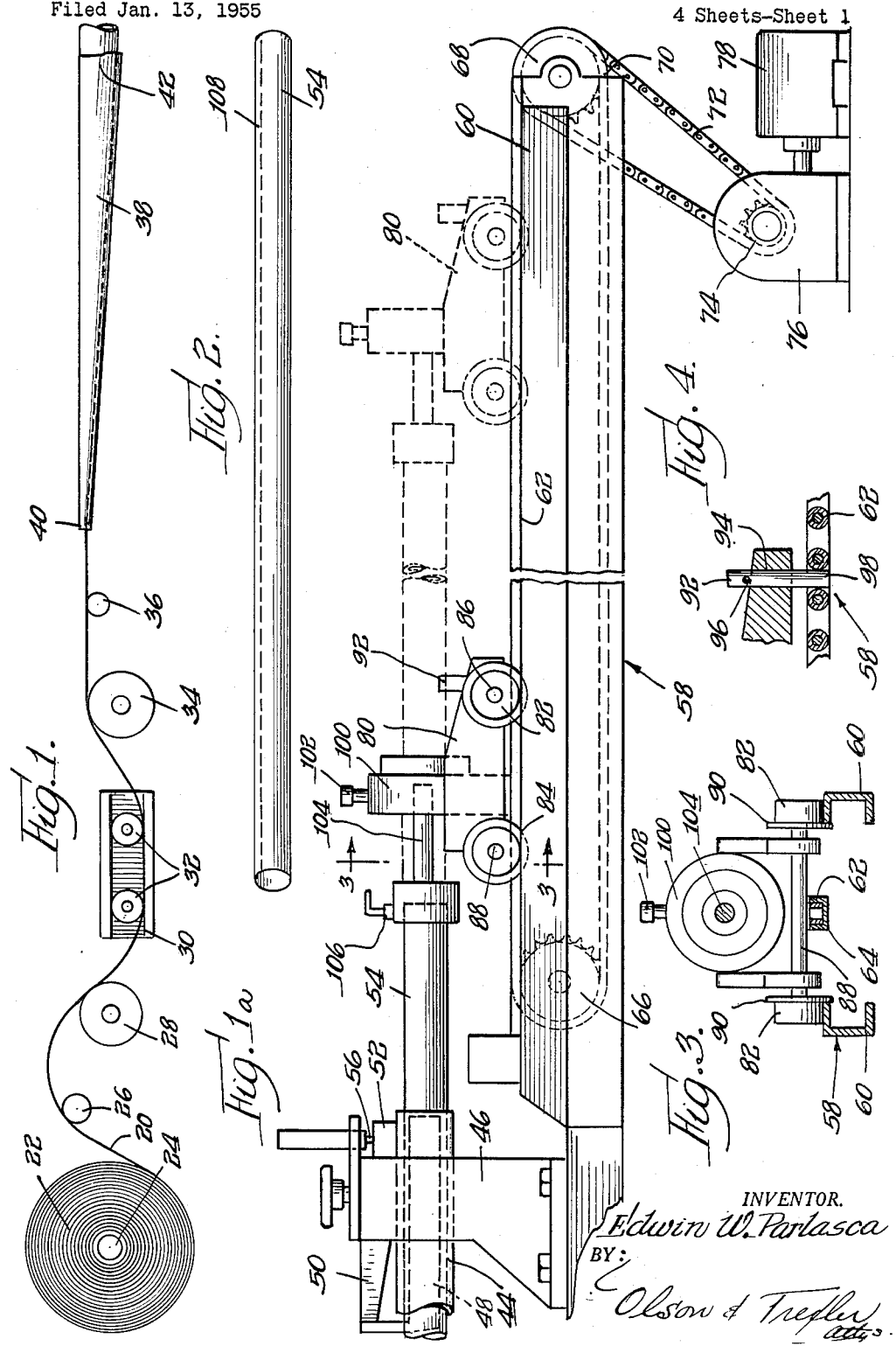

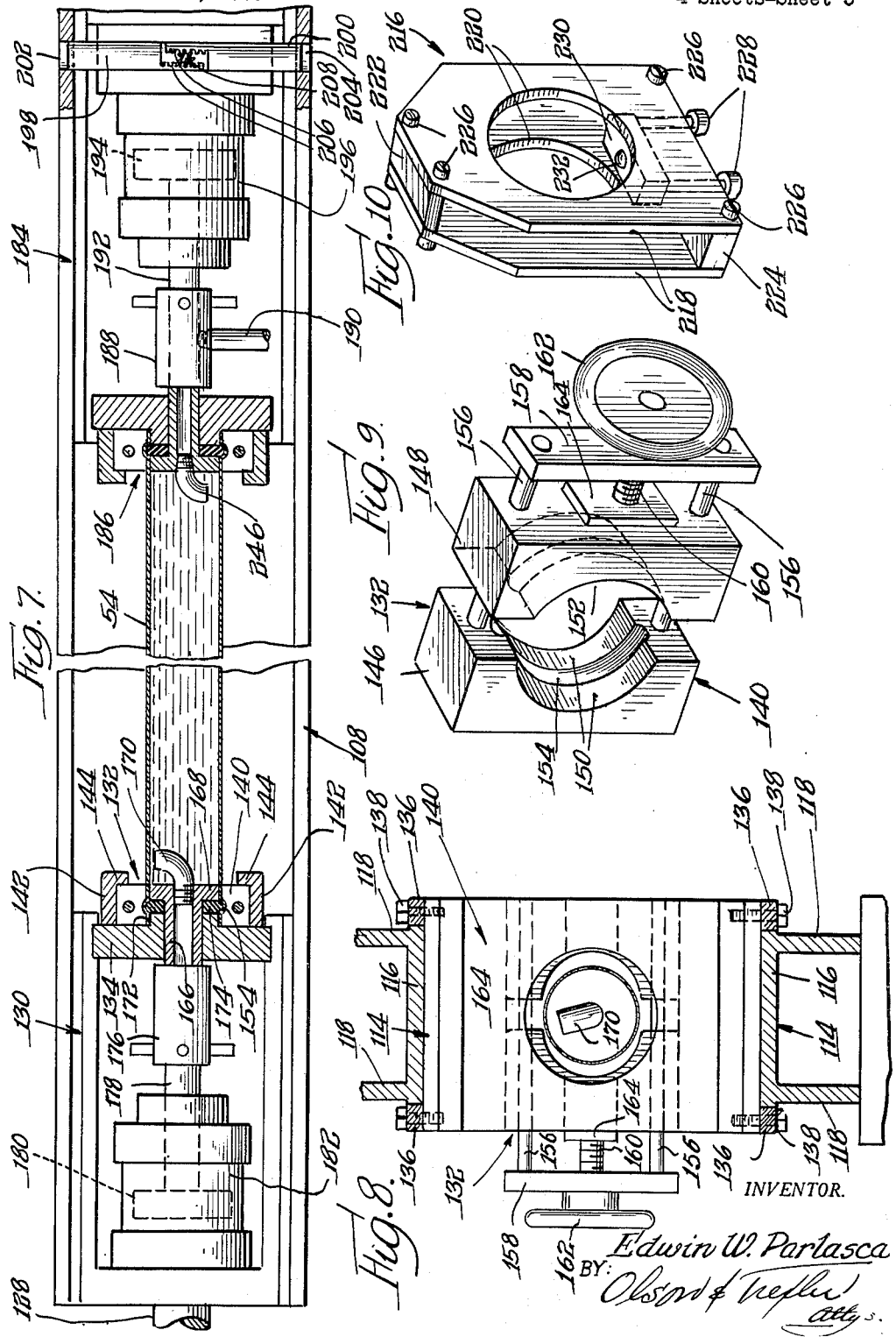

INVENTOR.
Edwin W. Parlasca
BY Olson & Trexler
Atty.

3,077,170
TUBE FORMING METHOD
Edwin W. Parlasca, Elgin, Ill., assignor to Flexonics Corporation, Maywood, Ill., a corporation of Illinois
Filed Jan. 13, 1955, Ser. No. 481,650
5 Claims. (Cl. 113—33)

This invention is concerned generally with the formation of metal tubing, and more particularly with the production of straight tubing of great strength. It has been the practice for some time to form a metal sheet into a generally cylindrical configuration, bringing the opposite edges of the metal sheet into butting or lapping relation, and then securing the edges together. For some purposes riveting or soldering may be sufficient, but for the utmost strength and for producing a leak-proof seam, it is preferred to weld the seam. Welding of the seam tends to produce a certain amount of distortion which for many purposes cannot be tolerated. Heat treating of the resulting tube to harden the same also may produce distortion. It will be apparent that the metal could not be hardened before formation into tubing.

It is an object of this invention to provide an improved method of producing metal tubing.

A further object of this invention is to provide an improved method of producing hardened metal tubing.

Yet another object of this invention is to provide a method of producing metal tubes of uniform cross section requiring calibration at only one point along the tubing.

A further object of this invention is to provide a method of straightening welded tubing.

Yet another object of this invention is to provide a method of simultaneously straightening and hardening welded tubing.

Briefly, my invention resides in forming a sheet of stainless steel into cylindrical shape, and welding the adjoining edges to one another. Hydraulic pressure then is applied internally of the resulting tube to stretch the stainless steel. Stainless steel has the extraordinary characteristic of increasing in tensile strength and yield strength as it is stretched past its yield strength. Accordingly, the internal hydraulic pressure applied to the tube causes the stainless steel tube to stretch past its yield point, thereby increasing its tensile strength and its yield strength. This effects work hardening of the stainless steel, and at the same time straightens out the tube. Application of further internal pressure effects a greater stretching of the stainless steel and a still further increase in tensile strength and yield strength.

Certain materials in sheet form are subject to localized yielding. Such yielding results in decreased wall thickness with consequent decrease in strength resulting in bubbles which expand to the bursting point. Stainless steel is not subject to localized yielding and does not form such bubbles since the work hardening, and accompanying increase in tensile and yield strength, increases at a more rapid rate than the stainless steel sheet wall thins. Thus, when one part expands, its tensile and yield strengths are increased, and the remaining parts of the tube must expand to the same degree before the internal pressure can overcome these greater strengths. The increase in size is incremental. Once a stainless steel tube starts to expand at one point, it will practically simultaneously expand at all points.

Although certain other metals may have this work hardening characteristic to a lesser degree, stainless steel is particularly noteworthy in work hardening at a faster rate than a tube wall thins, by ratio, and stainless steel will be referred to as the subject metal throughout the remainder of this specification.

The invention as well as other and further objects and advantages thereof will be apparent from the following description of a specific example thereof taken in connection with the accompanying drawings wherein:

FIG. 1 is a side view of a stainless steel strip moving into a machine for formation into a tube;

FIG. 1a is a continuation of FIG. 1 showing the machine producing the tube;

FIG. 2 is a view of the tube so produced;

FIG. 3 is a cross-sectional view taken along the line 3—3 in FIG. 1a;

FIG. 4 is a fragmentary detailed longitudinal sectional view showing the connection of the carriage or sled of FIG. 1a to the drive chain;

FIG. 5 is a plan view of the machine for effecting work hardening of the tube;

FIG. 6 is an elevational view of the machine shown in FIG. 5;

FIG. 7 is a longitudinal sectional view through the tube showing its cooperation with the machine shown in FIGS. 5 and 6;

FIG. 8 is a cross-sectional view taken substantially along the line 8—8 of FIG. 6;

FIG. 9 is a perspective view of the clamp apparatus shown in FIG. 8;

FIG. 10 is a perspective view of the calibrating device;

Figure 11:
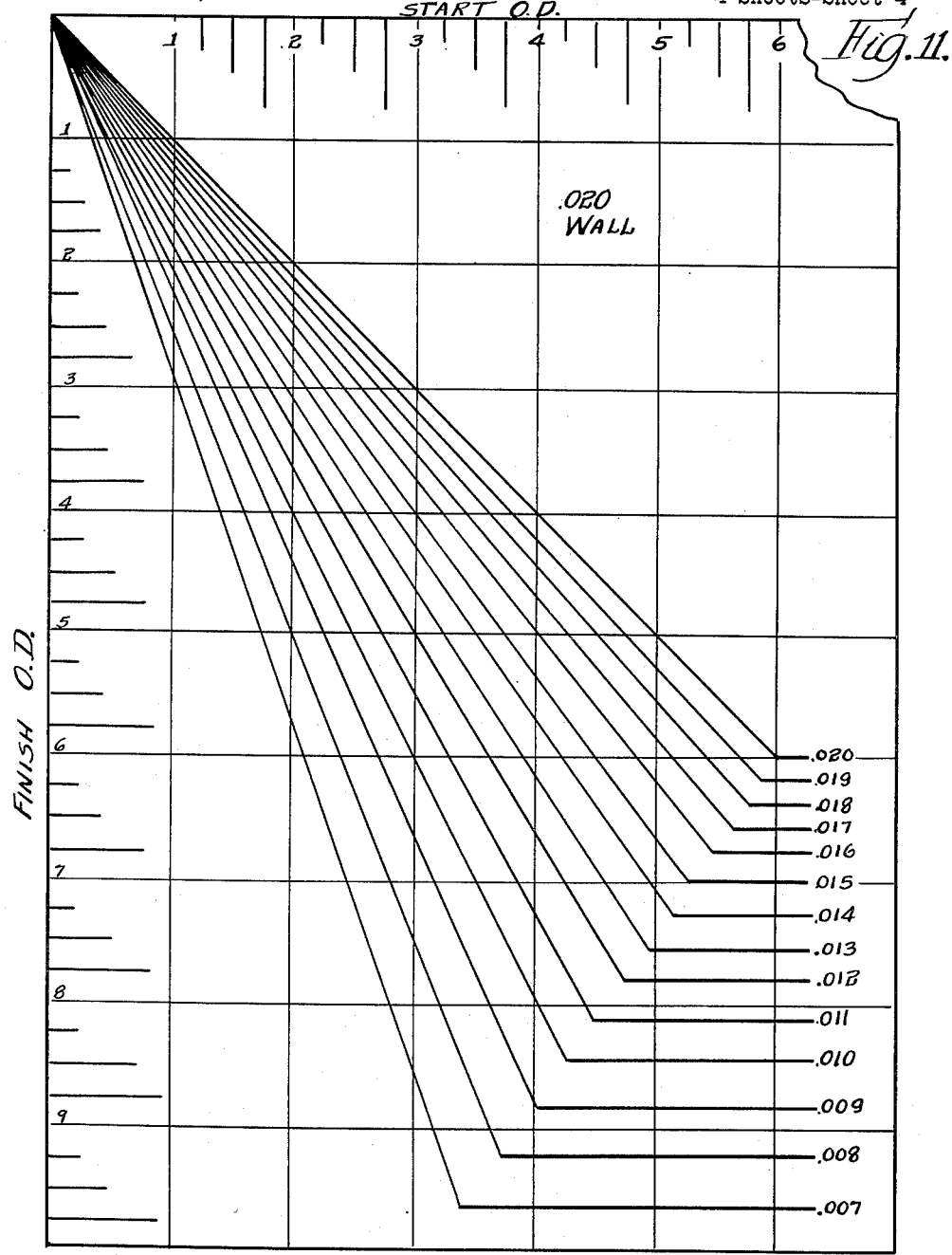
FIG. 11 is a chart or graph demonstrating the stretching of the tube.

Referring now in greater particularity to the drawings, and first to FIGS. 1–4, there will be seen a strip 20 of stainless steel fed from a coil 22 rotatably supported at 24. The strip 20 is fed from the coil 22 over a pair of rollers 26 and 28 and through a guide 30 having a pair of rollers 32 therein. The strip then passes over a larger roller 34 and a small roller 36 into a die member 38. The die member is progressively shaped into the form of a trough from its leading to its trailing edge. Thus, the die member varies from a shallow arc at its leading edge at 40 to a substantially cylindrical configuration at its trailing edge 42 which merges into the cylindrical bore of a bushing member 44 supported by an upstanding fixture 46. A short arbor 48 is supported within the bushing member 44 at the leading edge thereof by means such as a fixture 50 supported from the upstanding fixture 46 before the edges of the strip 20 are brought into abutting relation.

Welding apparatus 52 also is supported by the upright fixture for welding the preferably butting edges of the strip 20 to form a tube 54, although it will be understood that the edges could be lapped and welded. The welding apparatus 52 preferably is of the heli-arc type wherein the mandrel 48 comprises one terminal and a welding rod as 56 provides the other terminal which is spaced slightly from the butt joint to be welded. An arc therefore is drawn from the welding rod to fuse the butting edges of the strip. A blanket of helium surrounds the weld as it is made to preclude oxidation and burning of the metal.

A conveyor 58 is provided to the right of the upstanding fixture 46 and comprises a pair of side rails 60 in the form of parallel, spaced apart channels confronting one another. The conveyor further includes a sprocket chain 62 positioned substantially midway between the rails 60 and having its upper reach slidingly supported in a channel 64 to prevent sagging thereof. The sprocket chain 64 extends at the left end of the conveyor over an idler sprocket wheel 66 and at the right end over a drive sprocket wheel 68 driven by means of a pulley 70 over which a belt 72 passes. The belt 72 also passes over a pulley 74 on the output shaft of a speed changing mechanism 76 driven by means such as an electric motor 78.

The conveyor 58 further includes a carriage or sled 80 provided with pairs of front and rear wheels 82 and 84 respectively mounted on axles 86 and 88. The wheels are provided with rather broad tread or web portions rolling on the side rails 60, and with flanges 90 fitting along the insides of the side rails 60.

The carriage or sled 80 is provided adjacent its front end with a driving pin or lug 92. The lug extends through a vertical bore 94 in the carriage and is limited in downward movement by a cross pin 96, the lower end of the lug 92 projecting into the upper reach of the conveyor chain 62 as at 98. The importance of the channel 64 supporting the upper reach of the chain to prevent the upper reach of the chain from sagging out of engagement with the driving lug 92 will be apparent. Thus, the sprocket chain moves the sled or carriage 80 from the left end of the conveyor toward the right end, this changing position being indicated rather generally by the solid line and dashed line positions shown in FIG. 1a. The carriage is returned from the right end position to the left end postion by manually raising the driving lug 92 and manually rolling the carirage back to its left end position.

The carriage 80 is provided with an upstanding fixture 100 having a clamp 102 thereon for securing a horizontal rod or arbor 104. The rod or arbor 104 is provided at its outer end with a clamp mechanism 106 for clamping the end of the tube 54 both internally and externally. This clamp mechanism is generally similar to a clamp mechanism shortly to be described with regard to a later part of the machine, and the details thereof will not be set forth at this time. Thus, by virtue of the clamp mechanism 106 the carriage 80 pulls the tube 54 and strip through the forming mechanism to produce the finished tube 54 having the butt welded joint 108 therealong as shown in FIG. 2.

After a suitable length of tube 54 has been formed, it is cut off by any suitable cutting means such as a hack saw. It will be understood that the strip 20 could be of any suitable length to produce only one tube 54. However, it is preferable to have the strip be a multiple of the length of the tube 54 to avoid the necessity of manually staring the strip through the forming mechanism each time a tube is to be formed. In any event the tube 54 is formed to a suitable length and is removed from the mechanisms heretofore set forth for transfer to an expanding machine 108 shown in FIGS. 5-7. The expanding machine 108 comprises a pair of reinforced concrete piers 110 spaced apart a substantial distance, and carrying suitable framework 112. The framework includes upper and lower spaced apart beds 114, the cross sections of which are shown in FIG. 8. Each bed includes a broad web 116 lying in a horizontal plane, and a pair of longitudinally extending flanges 118 disposed at right angles thereto adjacent the opposite longitudinal edges of the web.

At the left end of the machine 108 there is a suitable control panel 120 having various controls 122 thereon. Also at the left end of the machine there is provided a hydraulic cylinder 124 fixedly supported from the pier 110 and having therein a piston 126. A piston rod 128 extends from the right end of the cylinder 124 and is connected to a sled or carriage 130 mounted for sliding movement between the beds 114 longitudinally of these beds.

The carriage 130 is provided at its right-hand end with a clamping fixture 132 shown in detail in FIGS. 7-9. The clamping mechanism 132 comprises a header 134 fixedly mounted in the carriage or sled 130. In FIG. 8 it will be seen that the sled is provided along its four longitudinal edges with runners 136 which are held to the sled by means such as bolts 138.

A clamp 140 is mounted on the header 134 by means such as a pair of horizontal members 142 having vertically directed retaining walls or flanges 144 on the outer ends thereof overlying the clamp 140.

The clamp 140 comprises a pair of generally similar sections 146 and 148 of generally rectangular configuration and each having a semicircular clamping surface designated by the numerals 150 and 152 respectively. The semicircular clamping surfaces 150 and 152 together combine to make a cylindrical clamping surface, and this surface is provided with a circumferential ring-like groove 154. A pair of studs 156 is fixed in the clamp member 146 adjacent the opposite ends thereof and extends through suitable bores in the clamp member 148. A cross bar 158 is fixed to the outer ends of the pair of studs 156. A screw 160 is threaded through the cross member 168 and has a hand wheel 162 fixed on its outer end. The inner end of the screw is mounted for rotation by means of a member 164 on the side of the clamp 148 which secures the screw 160 against longitudinal movement relative to the clamp 148. Thus, the clamping mechanism 132 can clamp about the outside of one end of the tube 54.

A hollow cylinder 166 extends through the header 134 and is provided with a flat head 168 having an elbow 170 threaded thereinto and opening upwardly for passing air from the tube 54 near the top thereof. The header 134 is formed with a boss 172 surrounding the cylinder 166 and confronting the under side of the head 168. A rubber ring 174 encircles the cylinder 166 and is positioned between the end of the boss and the under side of the head 168. Means is provided as will shortly be brought out to force the head toward the boss, thereby compressing the ring and forcing it outwardly against the inside of the tube, thereby deforming a portion of the tube into an annular groove 154 of the clamping mechanism and securely gripping the tube between the rubber ring and the clamping mechanism, while at the same time sealing the end of the tube.

The cylinder 166 extends into a fitting 176 for venting the interior of the tube 54 to the atmosphere through the elbow 170, the fitting 176 being provided with a valve for closing off the vent when the air in the tube is replaced by hydraulic fluid as shortly will be brought out. A piston rod 178 extends from the fitting 176 to a piston 180 in a cylinder 182 fixed to the carriage 130. Thus, when the piston 180 is moved to the left by hydraulic pressure, the head 168 will be brought toward the boss 172 to compress and deform the rubber ring 174 in the manner heretofore indicated.

A carriage or sled 184 is provided adjacent the opposite end of the expanding machine and is generally similar in construction to the carriage or sled 130 heretofore disclosed, including a clamping mechanism 186 similar to the clamping mechanism 132. The fitting 188 corresponding to the fitting 176 is provided with a flexible hydraulic line 190 for introducing hydraulic pressure into the tube 54. The fitting 188 is connected by means of a piston rod 192 to a piston 194 in a hydraulic cylinder 196. The cylinder 196 is fixed to the carriage or sled 184, and the carriage or sled is adjustably fixed to the frame of the machine, specifically the beds 114. The carriage is fixed by means of locking pins 198 and 200 which are moved into and out of suitable holes 202 and 204 of the webs 116 of the beds 114 by means such as a pair of racks 206 on the ends of the pins actuated by a spur gear 208 on the shaft of a hand wheel 210.

The tube 54 thus is supported at its opposite ends by the clamping mechanisms 132 and 186. The center section of the tube 54 further is supported by an adjustable tube spacer or table 212, and pairs of guides 214 are provided for properly positioning the tube laterally.

A calibrator 216 (FIGS. 5, 6, and 10) fits over the tube 54, conveniently near the left end thereof to bring the expanding operation to a halt when the tube has been expanded to a predetermined degree. The calibrator comprises a pair of similar plates 218 having aligned circular apertures 220 therein. The plates 218 are secured in spaced apart alignment by top and bottom spacer blocks 222 and 224, and by bolts 226 extending through the plates and blocks and having nuts threaded on the ends thereof. A pair of bolts 228 is threaded through the bottom block 226 and supports a microswitch 230 at the top thereof. The bolts 228 adjustably determine the height of the microswitch so that the actuating member 232 thereof projects into the cylindrical space defined by the openings 220 a predetermined distance whereby the microswitch will be actuated when the tube 54 extending therethrough has been expanded to a predetermined diameter. Actuation of the microswitch halts the expanding operation as heretofore has been indicated. Since the tube expands uniformly, only one calibrator is needed, and this conveniently is positioned near the left end of the tube as viewed in FIGS. 5 and 6.

The expanding machine is provided with three pumps 232, 234, and 236. These pumps all are high-pressure pumps, and need not necessarily be of high volume capacity. The two pumps 232 and 234 are driven by a common electric motor 238 having output shafts at both ends. These pumps and the motor are mounted in a hydraulic reservoir indicated generally at 240, this reservoir in a specific example of the machine being of 135 gallon capacity. The pump 232 is connected by means of suitable hydraulic lines and controls to operate the cylinder 124 and piston 126 for exerting the longitudinal stretching force on the tube. The pump 234 is connected by means of suitable hydraulic lines and valves to operate the two pistons 180, and 194 and associated cylinders 182 and 196 for clamping the clamps 138 and 186 on the ends of the tube. The pump 236 is driven by an electric motor 242 and is suitably connected with a drain tank 244 of any suitable size and design positioned beneath the machine for pumping water therefrom through suitable pipes and valves and the flexible line 190 through the fitting 188 and a downwardly directed elbow 246 (FIG. 7) into the tube 54. Air in the tube is displaced from the tube through the elbow 170 and the later is closed off. After this, pressure builds up in the tube to expand the same, a longitudinal stretching force being imposed on the tube at the same time by means of the hydraulic cylinder 124 and the piston 126.

Figure 12:
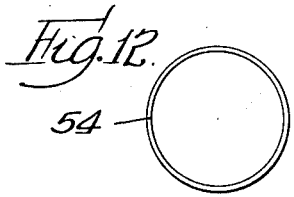
FIG. 12 is a cross-sectional view through the tube before stretching or expanding.
Figure 13:
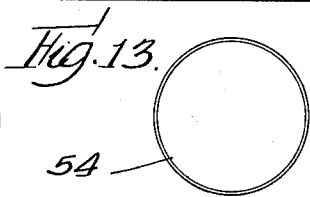
FIG. 13 is a similar cross-sectional view after stretching or expanding.

The expansion of the tube is illustrated in FIGS. 11–13 for a representative tube which might start out with a 3½ inch outside diameter and finish with a 4 inch outside diameter. The graph of FIG. 11 illustrates the expansion of a tube initially having a wall thickness of .020 inch. Assuming the tube to have a starting outside diameter of 3½ inches, the horizontal 3½ inch valve will be seen to cross the vertical 3½ inch valve corresponding to the finish outside diameter on the diagonal line .020, indicating the initial condition of the tube. Dropping vertically to the 4 inch finish outside diameter it will be seen that the finish wall thickness (reading from the diagonal lines) is between .017 and .018 inch, specifically .0175 inch. Dropping vertically beyond the 4 inch finish outside diameter to larger finish outside diameters allows the correspondingly thinner finish wall thicknesses to be read from the more-or-less diagonal lines. Various other starting outside diameters and finish outside diameters similarly can be read, and it will be apparent that the finish outside diameter with a predetermined wall thickness starting from a known outside diameter can be ascertained, or that a starting outside diameter can be ascertained if the desired final outside diameter and wall thickness are known. As heretofore has been indicated the specific chart shown in FIG. 11 is for a stock thickness of .020 inch, this being the starting wall thickness. Similar charts are used for various additional stock or initial wall thicknesses.

Reference to FIGS. 12 and 13 illustrates how the outside diameter (and also the inside diameter) of the tube 54 increases during expansion with a corresponding decrease in wall thickness.

In order that the method and apparatus heretofore set forth might fully be understood, the sequence of operations hereinafter will be outlined.

The stainless steel strip 20 is folded into a cylindrical tube and butt welded by means such as the forming and welding apparatus illustrated in FIGS. 1–4, and the cylindrical tube thus formed is cut off into suitable lengths by means such as a hack saw. The calibrator then is slipped over the tube, and the tube is placed in the clamps 132 and 186 of the expanding machine. The pumps 232 and 234 are operated to operate the pistons 180 and 194 for compressing the rings or gaskets as 174 to stretch a part of the tube into the complementary clamp groove, and to exert a longitudinal stretching force on the tube. The motor 242 and pump 236 are operated to pump water into the tube and to apply pressure to the interior of the tube. As an increment of the tube stretches, the stretched part of the material is work hardened to increase the tensile strength and yield point, thereby temporarily halting stretching at that point and resulting in like stretching throughout the entire length of the tube. It is to be understood that the "catching up" of the remainder of the tube in stretching after any part thereof stretches is substantially instantaneous. After this stretch or expanding has gone on for a time sufficient to produce the desired finish outside diameter, the microswitch 230 of the calibrator is actuated to bring the expanding operation to a halt, either by closing off suitable valves, or by stopping the motors 242 and 238.

The hydraulic pressure in the cylinders 182 and 196 and in the hydraulic cylinder 194 is released as is the water pressure in the tube. The clamps 132 and 186 then are released by turning the hand wheels as 162 and the tube is removed from the expanding machine, the water therein being spilled into the reservoir or tank 244. The crimped parts of the final tube as produced by the exterior portions 132 and 186 of the clamps then are cut off. The resulting tube is straight and true, and of absolutely uniform dimensions, and is stronger than a tube which has not been expanded.

Although there are other metals which work harden upon stretching at a faster rate than they thin out, stainless steel possesses this characteristic to a most noteworthy extent and forms a preferred material for my invention. There are various types of stainless steel, and types 321, 347, and 304 might be cited by way of example. Further by way of example, the tensile strength of the stainless steel during expansion of the tube is raised from 75,000 p.s.i. to 100,000 p.s.i., while the yield point is raised from 30,000 p.s.i. to 70,000 p.s.i. With a starting wall thickness of .020 inch and 3½ inch outside diameter the internal pressure will reach 875 to 900 p.s.i., while the end pull due to the internal end thrust and the exterior end pull will reach 15,000 pounds. The preferred starting wall thickness (stock thickness) is in the range of .010 inch to .025 inch. The minimum wall thickness generally is limited by the difficulty of welding, particularly butt welding, below a certain thickness, and the maximum thickness generally is limited by maximum internal pressures that can be attained safely and economically.

It is important to note that no confining dies are needed in carrying out my invention, and that calibration need be made at only one point along the tube, the usual end-to-end calibration thereby being eliminated.

As will be understood, to the extent that the original workpiece is non-uniform in thickness across its surface, such non-uniformity will appear in the size and shape of the finished article, in accordance with the methods hereinbefore described. In certain instances, wherein extreme accuracy in size and shape of the finished article is required, beyond the uniformity characteristics of the original workpiece, it may be desirable to interpose the workpiece within a confining sleeve against which the workpiece surface engages in the final expanding movement. It is to be understood that such a sleeve is not a die for shaping the workpiece, in the ordinary sense; but is a sizing die the purpose and function of which results from variations in thickness of the original workpiece stock.

The specific examples of the invention herein shown and described are for illustrative purposes only. Various structural changes will no doubt occur to those skilled in the art, and are to be understood as forming a part of my invention insofar as they fall within the spirit and scope of the appended claims.

I claim:

1. The method of making a tube of sheet metal such as stainless steel that increases in tensile strength through work hardening upon stretching at a faster rate than it thins, comprising forming a strip of such sheet metal substantially into a cylinder with the longitudinal edges of the strip contiguous to one another, sealing said contiguous edges to one another, plugging the opposite ends of said tube to render them fluid-tight, applying sufficient fluid pressure internally of said tube with the exterior substantially unconfined to stress the metal in all directions beyond its normal yield strength without rupture thereof and thereby uniformly stretching the metal of said tube to expand and work harden said tube, and applying an external force to said tube while applying such pressure, said external force being applied substantially at the ends of the tube and axially away therefrom and thereby stretching said tube longitudinally.

2. The method of making a tube as set forth in claim 1 which further includes calibrating the tube at one point along its length during the application of internal fluid pressure and of the external stretching force, and limiting the application of fluid pressure and of the external stretching force when the tube reaches a pedetermined diameter at that point.

3. The method of work hardening a tube of sheet metal such as stainless steel that increases in tensile strength through work hardening upon stretching at a faster rate than it thins, which comprises plugging the ends of said tube to render them fluid-tight, applying sufficient fluid pressure internally of said tube with the exterior substantially unconfined to stress the metal beyond its initial yield point without rupture thereof to stretch the metal of said tube uniformly for expanding and work hardening said tube, and applying an external force to the tube concurrently with the application of internal fluid pressure to stretch the same longitudinally.

4. The method of work hardening a tube as set forth in claim 3 and including the further steps of calibrating the tube at one point along its length, and limiting the application of internal pressure and external stretching force when the tube reaches a predetermined diameter at that point.

5. The method of work hardening a tube of sheet metal such as stainless steel that increases in tensile strength through work hardening upon stretching at a faster rate than it thins, comprising sealing the ends of said tube to render them fluid-tight, applying sufficient fluid pressure internally of said tube with the exterior substantially unconfined to stress the metal beyond its initial yield point without rupture thereof and thereby uniformly stretching the metal of said tube to expand and work harden said tube, and simultaneously with the application of internal fluid pressure applying an external stretching force to said tube adjacent the ends thereof in opposite longitudinal directions to augment the internal pressure in stretching the tube longitudinally.

References Cited in the file of this patent

UNITED STATES PATENTS

| | | |
|---|---|---|
| 1,461,848 | Jaquiery | July 17, 1923 |
| 1,733,455 | Ferrand | Oct. 29, 1929 |
| 1,834,128 | Langenberg | Dec. 1, 1931 |
| 1,879,009 | Anthony | Sept. 27, 1932 |
| 2,228,139 | Leonhardy | Jan. 7, 1941 |
| 2,336,524 | Bannister | Dec. 14, 1943 |
| 2,337,247 | Kepler | Dec. 21, 1943 |
| 2,355,316 | Mestas | Aug. 8, 1944 |
| 2,373,530 | Bertalan et al. | Apr. 10, 1945 |
| 2,391,766 | Barnhart | Dec. 25, 1945 |
| 2,559,210 | Bradley | July 3, 1951 |
| 2,581,673 | Kennedy | Jan. 8, 1952 |
| 2,581,787 | Dreyer | Jan. 8, 1952 |
| 2,689,409 | Frt et al. | Sept. 21, 1954 |
| 2,830,831 | Bosch | Apr. 15, 1958 |
| 2,837,810 | Ekholm | June 10, 1958 |

FOREIGN PATENTS

| | | |
|---|---|---|
| 689,043 | Great Britain | Mar. 18, 1953 |

OTHER REFERENCES

Handbook: "The Making, Shaping and Treating of Steels," fifth edition, pages 528–545, published by Carnegie-Illinois Steel Corp. (U.S. Steel Subsidiary), copyright. 1940.